(12) United States Patent
Nagatani et al.

(10) Patent No.: US 12,519,405 B2
(45) Date of Patent: Jan. 6, 2026

(54) POSITIONING DEVICE AND CONTROL METHOD THEREOF

(71) Applicant: IMASEN ELECTRIC INDUSTRIAL CO., LTD., Aichi (JP)

(72) Inventors: Kentaro Nagatani, Aichi (JP); Koichi Yamanoue, Aichi (JP)

(73) Assignee: IMASEN ELECTRIC INDUSTRIAL CO., LTD., Aichi (JP)

(*) Notice: Subject to any disclaimer, the term of this patent is extended or adjusted under 35 U.S.C. 154(b) by 163 days.

(21) Appl. No.: 18/568,725

(22) PCT Filed: Jun. 14, 2022

(86) PCT No.: PCT/JP2022/023808
§ 371 (c)(1),
(2) Date: Dec. 8, 2023

(87) PCT Pub. No.: WO2023/286510
PCT Pub. Date: Jan. 19, 2023

(65) Prior Publication Data
US 2024/0283380 A1 Aug. 22, 2024

(30) Foreign Application Priority Data
Jul. 13, 2021 (JP) .................................. 2021-115631

(51) Int. Cl.
*H02P 6/24* (2006.01)
*B60N 2/02* (2006.01)
(Continued)

(52) U.S. Cl.
CPC ............ *H02P 6/24* (2013.01); *B60N 2/02253* (2023.08); *B62D 1/181* (2013.01); *H02K 7/1166* (2013.01);
(Continued)

(58) Field of Classification Search
CPC .... H02P 6/24; H02P 29/60; H02P 7/04; H02P 3/12; B60N 2/02253; B62D 1/181;
(Continued)

(56) References Cited

U.S. PATENT DOCUMENTS 4,494,056 A * 1/1985 Nishijima ................ H02P 3/06
318/269
8,288,974 B2 * 10/2012 Aoki ...................... H02P 7/281
363/63
(Continued)

FOREIGN PATENT DOCUMENTS

JP S63-207741 A 8/1988
JP H05-8673 A 1/1993
(Continued)

OTHER PUBLICATIONS

International Search Report dated Aug. 9, 2022, for the corresponding application No. PCT/JP2022/023808, with English translation.
(Continued)

*Primary Examiner* — David Luo
(74) *Attorney, Agent, or Firm* — LUCAS & MERCANTI, LLP

(57) ABSTRACT

A positioning device contains an actuator composed of a DC motor, a deceleration mechanism, and a single-phase rotation sensor for detecting the amount of rotational displacement of the deceleration mechanism, and an electronic control unit that electrically drives the DC motor. The electronic control unit decelerates and controls the DC motor to stop at a target rotation stop position, which is approximately midway between the rising edge and the falling edge of the output pulse of the rotation sensor.

21 Claims, 22 Drawing Sheets

(51) Int. Cl.
    *B62D 1/181*     (2006.01)
    *B62D 1/185*     (2006.01)
    *B62D 1/187*     (2006.01)
    *H02K 7/116*     (2006.01)
    *H02K 11/215*     (2016.01)

(52) U.S. Cl.
    CPC ............ *H02K 11/215* (2016.01); *B62D 1/185* (2013.01); *B62D 1/187* (2013.01)

(58) Field of Classification Search
    CPC ...... B62D 1/185; B62D 1/187; H02K 7/1166; H02K 11/215
    USPC ................................ 318/400.09, 400.01, 700
    See application file for complete search history.

(56) References Cited

U.S. PATENT DOCUMENTS

| | | | |
|---|---|---|---|
| 8,720,986 B2* | 5/2014 | Nagase | B60J 7/0435 |
| | | | 296/214 |
| 8,803,458 B2* | 8/2014 | Horikoshi | H02P 3/22 |
| | | | 318/400.29 |
| 10,027,272 B2* | 7/2018 | Ikai | B23Q 5/58 |
| 2013/0154534 A1 | 6/2013 | Okada et al. | |

FOREIGN PATENT DOCUMENTS

| | | |
|---|---|---|
| JP | 2003-189651 A | 7/2003 |
| JP | 2011-042280 A | 3/2011 |
| JP | 2011-176942 A | 9/2011 |
| JP | 2013-129251 A | 7/2013 |
| JP | 2015-145711 A | 8/2015 |
| JP | 2017-196979 A | 11/2017 |
| WO | 2009/110321 A1 | 9/2009 |

OTHER PUBLICATIONS

Extended European Search Report, mailed Jun. 17, 2025, for the related European patent application No. 22841854.7, 7 pages.

* cited by examiner

A-Direction arrow exploded diagram

《 Configuration of the control device 》

Motor drive stop control flow

Fig.13

Calculation method of T2

| Method 1: calculation using a table |
| Method 2: calculation using the magnitude of load |

Fig.14

Method 1: calculation using a table (A) (1) Table for each moving direction
- M11 T2 — Rotation speed or Voltage
- M12 T2 — Rotation speed or Voltage
- M13–M16

(B) (2) Table for each movement angle
- M21 T2 — Rotation speed or Voltage
- M22 T2 — Rotation speed or Voltage
- M23, M24

(C) (3) Table for different rotation direction
- M31 T2 — Rotation speed or Voltage
- M32 T2 — Rotation speed or Voltage
- M33, M34

(D) (4) Table for each stop position
- M41 T2 — Rotation speed or Voltage
- M42 T2 — Rotation speed or Voltage
- M43–M4n (E) (5) Table for aging time
- M51 T2 — Rotation speed or Voltage
- M52 T2 — Rotation speed or Voltage
- M53–M5n (F) (6) Table for temperature
- M61 T2 — Rotation speed or Voltage
- M62 T2 — Rotation speed or Voltage
- M63–M6n Method 2: calculation using the magnitude of load (A)

Fig.18
《 Calculation method 2 of T2 》
(A)
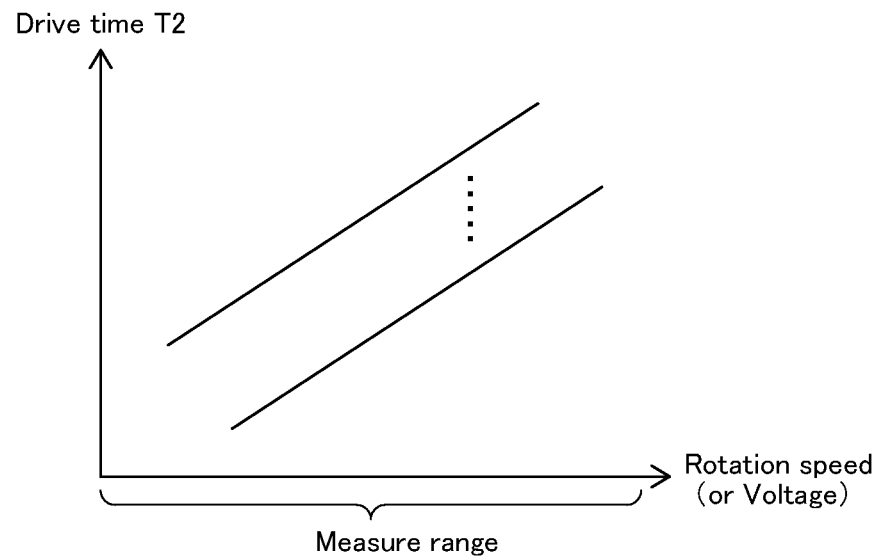
(B)
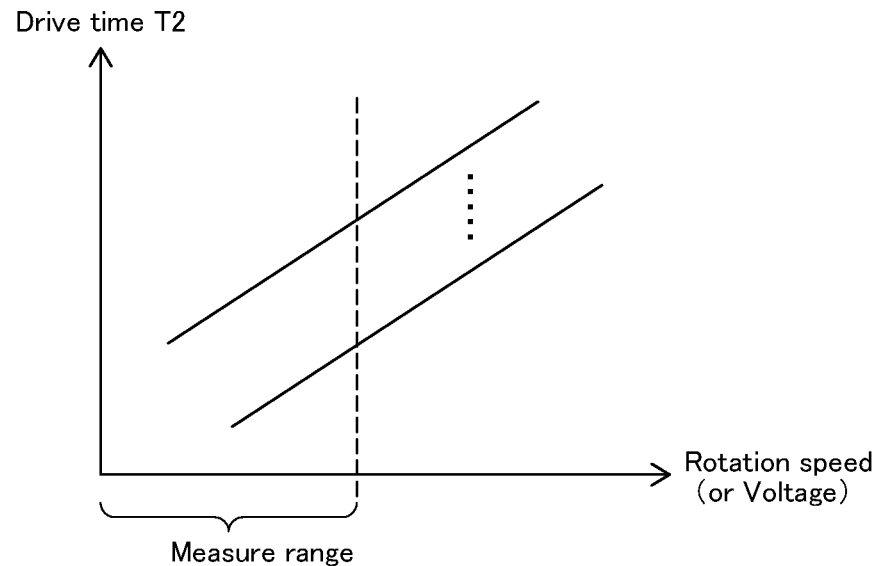

POSITIONING DEVICE AND CONTROL METHOD THEREOF

CROSS REFERENCE TO RELATED APPLICATION

This Application is a 371 of PCT/JP2022/023808 filed on Jun. 14, 2022, which, in turn, claims priority of Japanese Patent Application No. 2021-115631 filed on Jul. 13, 2021, and the above applications are incorporated herein by reference.

TECHNICAL FIELD

The present invention relates to an electric drive system that drives a moving body by an actuator incorporating an electric motor and controls it to a predetermined position. In particular, the present invention relates to a positioning device and a control method thereof, which are applied to a movable part such as an electric power seat of a vehicle and perform positioning control with high accuracy.

BACKGROUND ART

Conventionally, this type of positioning device is mechanically coupled to the moving body to be driven. The positioning device is composed of an actuator composed of a DC motor, a speed reduction mechanism, and a rotation sensor that detects the amount of rotational displacement of the speed reduction mechanism, and an electronic control device that electrically drives the DC motor.

Specifically, an electric power seat for a vehicle is known which is composed of an actuator 2 attached to the seat back shown in FIG. 1 and an electronic control device 1 which takes in a signal from an operation switch 3 and drives the actuator. A detailed example of the actuator portion is shown in FIG. 2.

In the actuator portion of FIG. 2, the second gear 212 fixed to the seat frame and the small diameter gear (not shown) arranged coaxially with the first gear 211 are meshed. The worm gear 210 and the worm gear 210 connected to the motor shaft are meshed.

With the configuration shown in FIG. 2, when the motor 200 is driven, the worm gear 210 rotates to rotate the first gear 211. The small-diameter portion (not shown) of the first gear revolves around the second gear 212 to electrically adjust the tilt angle of the seatback.

FIG. 3 is a diagram showing a detailed example of a rotation sensor portion. The rotation sensor portion consists of a magnet 201 consisting of a single pair of magnetic poles arranged coaxially with the rotation axis of the motor, and a Hall element 202 arranged in a fixed portion to detect the magnetic field generated by the magnet as an electric signal. The two constitute a known single-phase rotary encoder.

As a result, the Hall element 202 outputs an electrical signal of one pulse each time the rotating shaft of the motor makes one rotation. The electronic control unit 1 is configured to integrate the number of pulses in a predetermined direction, calculate the inclination angle of the seatback, and store the result.

The above configuration is applied not only to the tilt of the seat back, but also to control the longitudinal slide position of the seat and to control the height of the seat in the longitudinal direction. Since these various positioning controls can be electrically performed, a well-known memory power seat function is realized that reproduces arbitrary seat positions set for each of a plurality of drivers by one-touch operation.

By the way, the single-phase rotary encoder cannot determine the rotation direction of the motor shaft from the output signal of the Hall element. Therefore, as described in Patent Document 1, when the driving of the motor is stopped when the driving mechanism reaches the end of the movable range, the motor is reversely driven by the reaction force on the load side. A deviation occurs between the actual position of the sheet and the position detected and stored by the device.

Therefore, according to Patent Document 1, when the motor stops at the end of the movable range, it is recognized as a mechanical lock, and the rotation pulses generated during the motor off period are accumulated as reverse rotation.

Alternatively, a solution has been proposed for accurately storing the seat position, such as holding the operation request by the user until the motor rotation can be determined in order to prohibit short-time motor driving.

PRIOR ART PUBLICATION

Patent Publication

Patent Publication (1): Japanese Laid-Open Patent Publication No. 2011-42280

SUMMARY OF THE INVENTION

Problem(s) to be Solved by the Invention

However, the cause of erroneous detection of the movable position of each part of the seat by the rotation sensor is not limited to the reversal operation at the end of the movable range. In addition, the erroneous detection of the operating position of each part of the seat by the rotation sensor may be caused by the fact that the user's operation within the movable range is too short, causing the motor to stop before the rotation sensor generates a pulse.

For example, assuming that the stop position within the movable range is very close to the edge of the pulse output by the rotation sensor, after the power supply to the electronic control unit is cut off, the motor may slightly rotate due to an external force acting on each part of the seat.

At this time, the physical rotation angle of the motor shaft due to such minute rotation of the motor may exceed the edge position of the output pulse of the rotation sensor. If the electronic control unit is energized again to change the seat position, one count of the number of pulses is lost.

Furthermore, if the stop position is very close to the edge of the pulse output by the rotation sensor, immediately after the rotation of the motor stops, the motor may rotate by a very small angle due to the backlash of the speed reduction mechanism or the like.

At this time, if the motor stops at the falling edge of the rotation sensor pulse, the rising edge in the opposite direction will be detected immediately after. Therefore, the electronic control unit recognizes that the movable part has moved by one pulse in the control direction, and erroneously recognizes that it has moved by one pulse more than the original stop position.

Therefore, there was a problem that if the playback operation of the memory power seat was repeated about 100 times, a large deviation from the originally set seat position would occur.

The present invention has been made in view of the above problems. The present invention relates to a positioning device composed an actuator composed of a DC motor, a speed reduction mechanism, and a single-phase rotation sensor for detecting the amount of rotational displacement of the speed reduction mechanism, and electronic control device for electrically driving the DC motor. The positioning device performs highly accurate positioning control without causing an error between the mechanical displacement amount of a controlled object and the integrated pulse number of a rotation sensor stored in an electronic control device.

Solution(s) to the Problem(s)

The present invention according to the first embodiment is a positioning device, comprising:
- an actuator connected to a moving body and composed of a DC motor, a speed reduction mechanism, and a single-phase rotation sensor for detecting an amount of rotational displacement of the speed reduction mechanism; and
- the electronic control device for electrically driving the DC motor;
wherein
the electronic control device comprises stop control means for performing deceleration control so as to stop the DC motor, with a target rotation stop position set substantially midway between the rising edge and the falling edge of the output pulse of the rotation sensor.

The present invention according to the second embodiment is a positioning device, wherein
said stop control means performs deceleration control to decelerate and stop the DC motor in an inertial rotation mode in which power supply to the DC motor is interrupted.

The present invention according to the third embodiment is a positioning device, wherein
said stop control means performs deceleration control to decelerate and stop the DC motor in a braking mode in which power supply terminals of the DC motor are electrically shorted.

The present invention according to the fourth embodiment is a positioning device, wherein
said stop control means performs deceleration control to decelerate and stop the DC motor in a forced braking mode in which electric power is applied to power supply terminals of the DC motor to provide a rotational force in a direction opposite to the direction in which the DC motor rotates during operation.

The present invention according to the fifth embodiment is a positioning device, wherein
said stop control means performs deceleration control to decelerate and stop the DC motor by combining at least the following two or more modes:
The modes are;
- an inertial rotation mode in which power supply to the DC motor is cut off,
- a braking mode in which the power supply terminals of the DC motor are electrically shorted, and
- a forced braking mode in which electric power is applied to the power supply terminals of the DC motor to give a rotational force in the direction opposite to the direction in which the DC motor rotates during operation.

The present invention according to the sixth embodiment is a positioning device, wherein
said stop control means estimates a rotation stop position from the deceleration of the DC motor, and decelerates the DC motor to stop at the target rotation stop position, in a process of controlling the DC motor to decelerate and stop.

The present invention according to the seventh embodiment is a positioning device, wherein
said stop control means controls the rotation speed of the DC motor so that the rotation speed before starting control to decelerate and stop the DC motor reaches a predetermined value.

The present invention according to the eighth embodiment is a positioning device, wherein
said rotation speed control is performed by making the voltage applied to the power supply terminal of the DC motor variable.

The present invention according to the ninth embodiment is a positioning device, wherein
said rotation speed control is performed by making the current applied to the power supply terminal of the DC motor variable.

The present invention according to the tenth embodiment is a positioning device, wherein
said rotation speed control is performed by making the duty ratio of the voltage applied to the power supply terminals of the DC motor variable.

The present invention according to the eleventh embodiment is a positioning device, wherein
said rotational speed of the DC motor set by the rotational speed control of the stop control means is a function of an ambient temperature of the DC motor.

The present invention according to the twelfth embodiment is a positioning device, wherein
said rotation speed of the DC motor set by the rotation speed control of the stop control means is determined by the motor load state immediately before starting the process of controlling the speed reduction of the DC motor.

The present invention according to the thirteenth embodiment is a positioning device, wherein
said load state of the motor is calculated from at least one information of the rotation speed of the motor calculated from the output pulse of the rotation sensor, the voltage applied to the motor, or the current value of the motor.

The present invention according to the fourteenth embodiment is a positioning device, wherein
said stop control means starts the process of performing the deceleration control so as to stop the DC motor at the target rotation stop position at a predetermined timing synchronized with the output pulse of the rotation sensor.

The present invention according to the fifteenth embodiment is a positioning device, wherein
said stop control means
calculates a required motor stop time T2 required from the start of stop control of the DC motor to the actual stop of the DC motor,
calculates a time T1, which is the difference between the timing of starting the stop control and the current time, in order to stop the DC motor at the target rotation stop position; and
when it is determined that it is necessary to stop the DC motor, after the time T1 has passed, starts a control to stop the DC motor.

The present invention according to the sixteenth embodiment is a positioning device, wherein said required motor stop time T2 is calculated by providing a table of the relationship between the rotational speed or applied voltage of the DC motor and the required motor stop time T2,
such a table is configured by at least one of per movement direction, per movement angle, per rotation direction, per stop position, per aging time, and per temperature.

The present invention according to the seventeenth embodiment is a positioning device, wherein
said stop control means calculates the load of the DC motor by using at least one of output pulse period/voltage, output pulse period/current, and output pulse period/power.

The present invention according to the eighteenth embodiment is a positioning device, wherein
when the stop control means calculates the time T1, which is the difference between the timing of starting the stop control and the current time, the time T1 includes the time T3 required for arithmetic processing.

The present invention according to the nineteenth embodiment is a positioning device, wherein
the moving body is an electric power seat for a vehicle.

The present invention according to the twentieth embodiment is a positioning device, wherein
the moving body is an electric tilt/telescopic steering system for a vehicle Effect(s) of the Invention The positioning device in the first embodiment, the electronic control device comprises a stop control means for decelerating and stopping the DC motor with a target rotation stop position set at a substantially intermediate position between the rising edge and the falling edge of the output pulse of the rotation sensor. The rotation stop position of the motor within the movable range of the moving body is not near the edge of the pulse output from the rotation sensor. Therefore, even if the motor is slightly rotated by an external force acting on each part of the seat, there is an effect that an erroneous pulse is not generated from the rotation sensor.

Therefore, even if the memory power sheet reproduction operation is repeated several hundred times or more, there is no deviation from the originally set seat position.

The positioning device in the second embodiment, the stop control means decelerates the DC motor and stops it at a target rotation stop position in an inertial rotation mode in which power supply to the DC motor is interrupted.
Alternatively, the stop control means can stop the DC motor at the target rotation stop position by repeating the operation of intermittently energizing and rotating the DC motor during the inertia rotation mode.

The positioning device in the third embodiment, the stop control means decelerates the DC motor and stops it at a target rotation stop position in a known braking mode in which the power supply terminals of the DC motor are electrically shorted. Alternatively, the stop control means can stop the DC motor at the target rotation stop position by repeating the operation of intermittently energizing the DC motor and rotating it during the braking mode. It is possible to stop the motor at an accurate target rotation position in a short period of time.

The positioning device in the fourth embodiment, the stop control means decelerates the DC motor to stop the target rotation stop position in a forced braking mode in which electric power is applied to power supply terminals of the DC motor to give a rotational force in a direction opposite to the direction in which the DC motor rotates during operation. Alternatively, the stop control means can stop the DC motor at the target rotation stop position by repeating the operation of intermittently applying current in the direction in which the DC motor is operating during the forced braking mode. It is possible to stop the motor at an accurate target rotation position in a shorter time.

The positioning device in the fifth embodiment, the stop control means performs deceleration control to decelerate and stop the DC motor by combining at least the following two or more modes:
The modes are;
an inertial rotation mode in which power supply to the DC motor is cut off,
a braking mode in which the power supply terminals of the DC motor are electrically shorted, and
a forced braking mode in which electric power is applied to the power supply terminals of the DC motor to give a rotational force in the direction opposite to the direction in which the DC motor rotates during operation. Therefore, there is an effect that the control for stopping at the target rotation stop position is facilitated.

The positioning device in the sixth embodiment, the stop control means estimates a rotation stop position from the deceleration of the DC motor in the process of controlling the DC motor to decelerate and stop. Then, when it is estimated that the motor will stop before the target rotation stop position, the stop control means either energizes the DC motor for a short period of time to rotate it, or selects the mode with a small deceleration. It is possible to accurately control the rotation stop position of the DC motor.

On the other hand, when it is estimated that the DC motor will stop after passing the target rotation stop position, the rotation stop position of the DC motor can be accurately controlled by selecting the mode with a larger deceleration.

The positioning device in the seventh embodiment, the stop control means controls the rotation speed of the DC motor so that the rotation speed before starting the control for decelerating the DC motor becomes a predetermined value. The stop control means does not need to perform complicated control in the process of controlling the motor to decelerate and stop. The stop control means can accurately stop the motor at the target rotation stop position by a single deceleration means such as the inertial rotation mode or brake mode.

The positioning device in the eighth embodiment, the rotation speed control is performed by varying the voltage applied to the power supply terminal of the DC motor, therefor the rotation speed control of the motor can be performed by a known voltage control technique such as a switching regulator.

The positioning device in the ninth embodiment, the rotation speed is controlled by varying the current applied to the power supply terminal of the DC motor, therefor the rotation speed can be controlled to be stable with little influence of the mechanical load of the motor.

The positioning device in the tenth embodiment, the rotation speed control is performed by varying the duty ratio of the voltage applied to the power supply terminals of the DC motor. In this case, a known H-bridge circuit is adopted as a drive circuit formed inside the electronic control unit.

This configuration facilitates reversing the polarity of the voltage applied to the power supply terminals of the motor. Opening and short-circuiting of the motor power supply terminals for performing the inertial rotation mode and the braking mode, and reverse energization for performing the forced braking mode, which are performed by the stop control means subsequent to the rotation speed control of the motor become easier.

The positioning device in the eleventh embodiment, the rotation speed of the DC motor, which is set by the rotation speed control of the stop control means, is a function of the ambient temperature of the motor. Therefor as a result of the viscosity of the lubricating material changing with temperature, it is possible to prevent the actual stopping time, that is, the rotation stopping position of the motor from changing when decelerating and stopping are controlled in each mode.

The positioning device in the twelfth embodiment, the rotation speed of the DC motor, which is set by the rotation speed control of the stop control means, is determined by the motor load state immediately before the process of performing deceleration control is started. Therefore, when the motor load is large and the motor is decelerated in each of the above modes, if the time until the motor stops is too short, the rotational speed of the motor set by the rotational speed control is increased. When the motor load is small and the motor is decelerated in each of the above modes, if the time until the motor stops is too long, the rotational speed of the motor set by the rotational speed control is reduced. As a result, the motor can be accurately stopped at the target rotation stop position.

The positioning device in the thirteenth embodiment, the motor load state is calculated from at least one information of the rotational speed of the motor calculated from the output pulse of the rotation sensor, the voltage applied to the motor, or the energized current value of the motor. Therefore, the motor load state can be easily measured.

The positioning device in the fourteenth embodiment, the stop control means stops the DC motor at a substantially intermediate position between the rising edge and the falling edge of the rotation sensor. For this reason, the stop control means starts the deceleration control at a predetermined timing synchronized with the output pulse of the rotation sensor so that the difference between the estimated stop position and the target rotation stop position is zero. Therefore, the motor can be accurately stopped at the target rotation stop position.

The positioning device in the fifteenth embodiment, the stop control means calculates a required motor stop time T2 required from the start of stop control of the DC motor until the DC motor actually stops, and stops the DC motor at the target rotation stop position. For this reason, the stop control means calculates the time T1, which is the difference between the timing at which the stop control is started and the current time, and determines that the DC motor needs to be stopped. After that, stop control of the DC motor is started. Therefore, the motor can be accurately stopped at the target rotation stop position.

The positioning device in the sixteenth embodiment, the stop control means calculates the required motor stop time T2 by providing a table of the relationship between the rotational speed or applied voltage of the DC motor and the required motor stop time T2. Such a table is configured by at least one of movement direction, movement angle, rotation direction, stop position, aging time, and temperature. Therefore, the motor can be accurately stopped at the target rotation stop position without being affected by the movement angle, rotation direction, stop position, aging time, or temperature.

The positioning device in the seventeenth embodiment, the stop control means calculates the load of the DC motor using at least one of output pulse period/voltage, output pulse period/current, and output pulse period/power. Therefore, the motor can be accurately stopped at the target rotation stop position without being affected by load fluctuations.

The positioning device in the eighteenth embodiment, the stop control means includes a time T3 required for arithmetic processing in the time T1 when calculating the time T1, which is the difference between the timing at which the stop control is started and the current time. Even if the arithmetic processing takes a long time, the motor can be accurately stopped at the target rotation stop position.

BRIEF DESCRIPTION OF THE DRAWINGS

FIG. 13 is a diagram showing a method of calculating T2;

FIG. 14 is a diagram showing a table of T2;

FIG. 18 is a diagram showing a measurement region of T2 when deceleration control is performed;

MODE TO CARRY OUT THE INVENTION

Embodiment

First Embodiment

Figure 1:
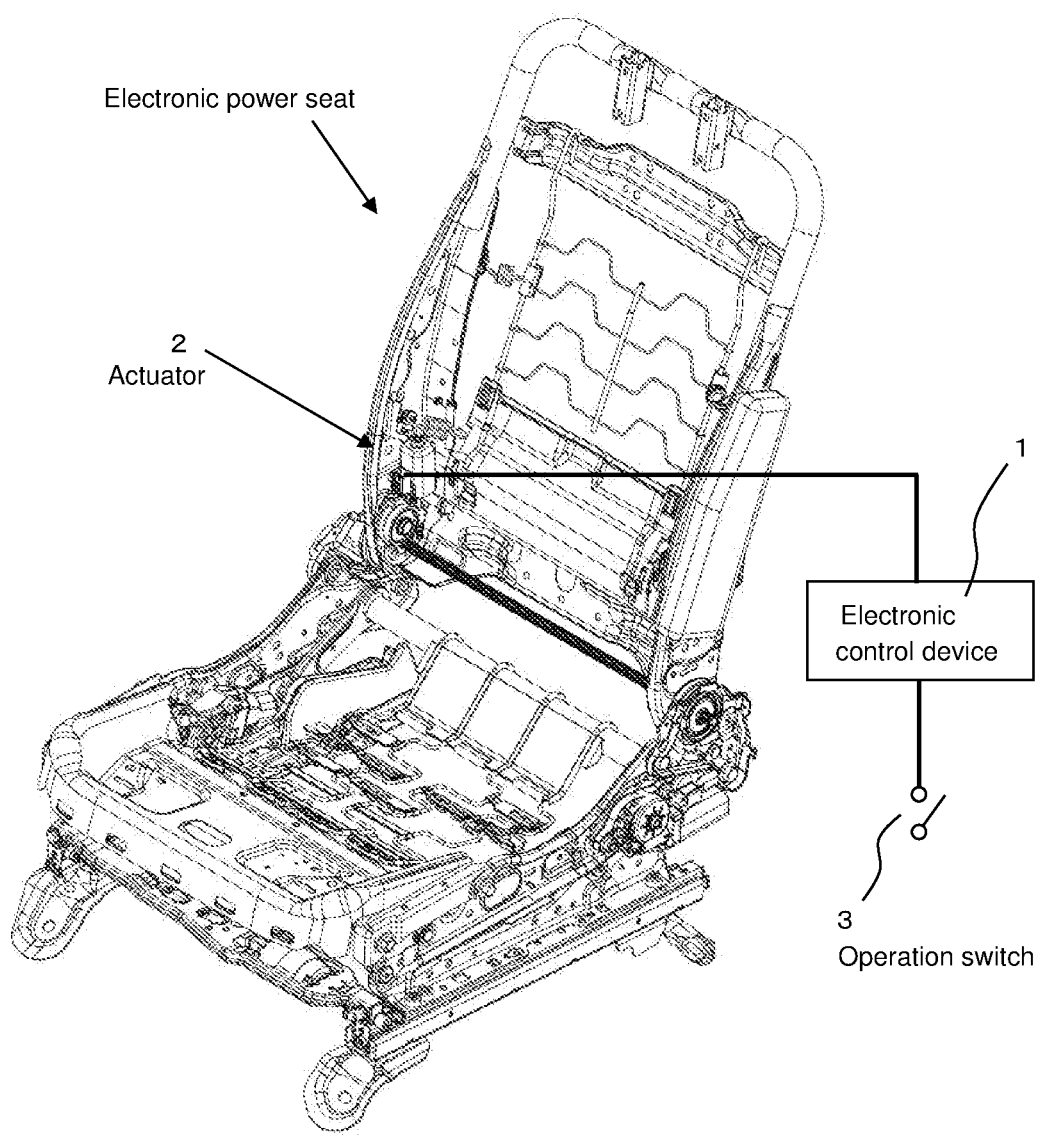
FIG. 1 is a diagram showing the structure of an electric power seat.

Hereinafter, embodiments of a positioning device and a control method thereof according to a first embodiment of the present invention will be described with reference to each drawing. FIG. 1 shows the overall structure of an electric power seat. A reclining actuator 2 is fixed to a frame forming an internal skeleton of the electric power seat. It has an electronic control unit 1 that electrically controls the actuator 2 and receives a signal from the operation switch 3.

Figure 2:
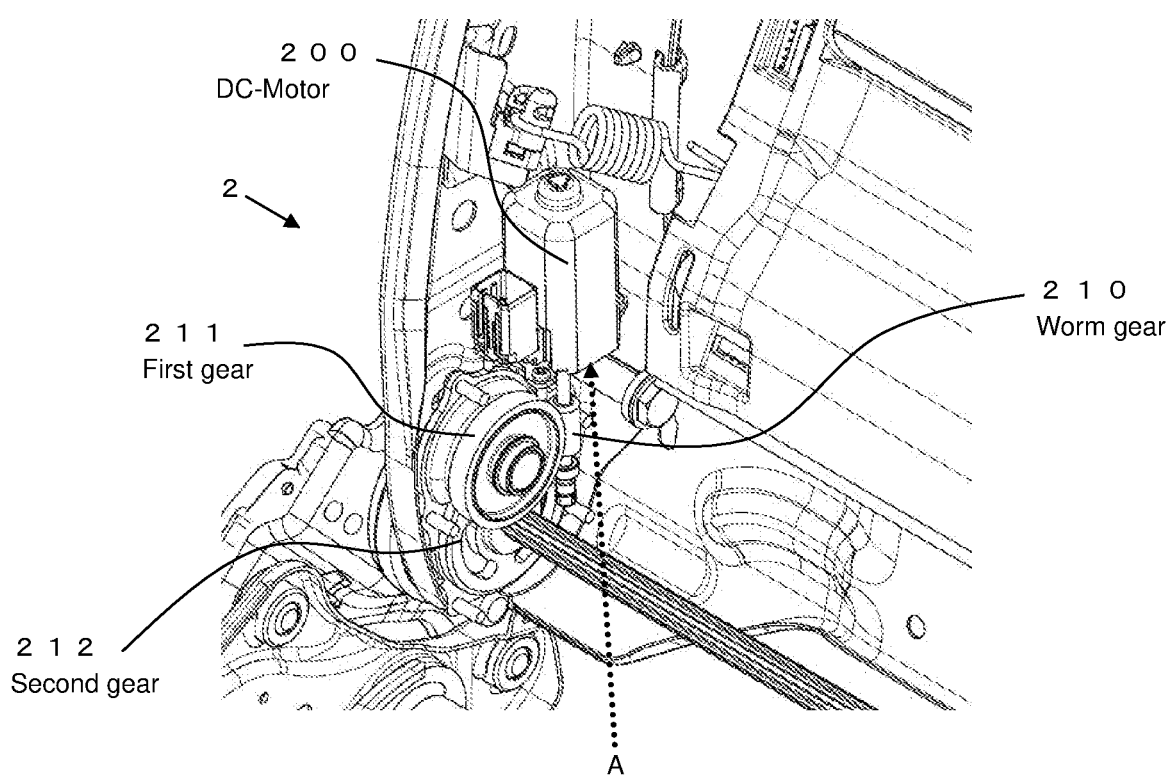
FIG. 2 is an enlarged view of the vicinity of the reclining actuator.
Figure 3:
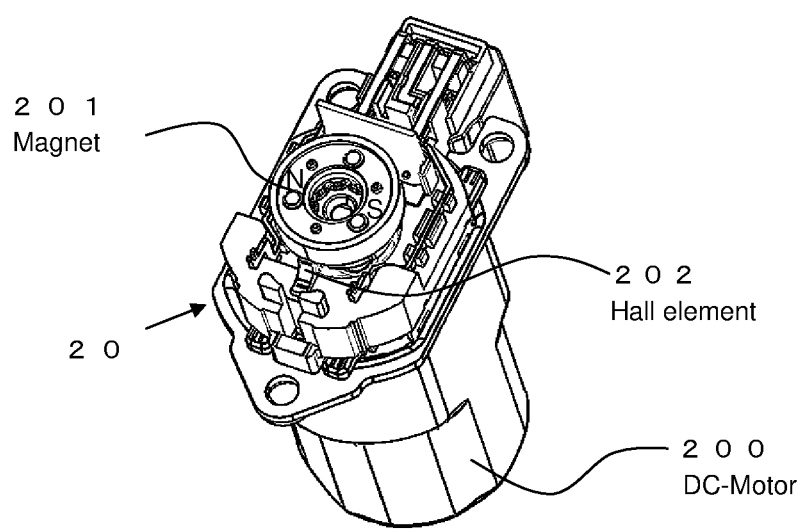
FIG. 3 is a diagram showing the structure of a DC motor and a rotation sensor.

The actuator 2 comprises a DC motor 200, a worm gear 210, a first gear 211 and a second gear 212, as shown in FIG. 2. FIG. 3 shows the internal structure of the motor viewed from direction A.

The magnet 201, shown in FIG. 3, is a ring-shaped ferrite magnet having a pair of N and S magnetic poles that is coaxially connected to and fixed to the rotor of the DC motor 200, and rotates in conjunction with the rotor of the motor 200.

Figure 4:
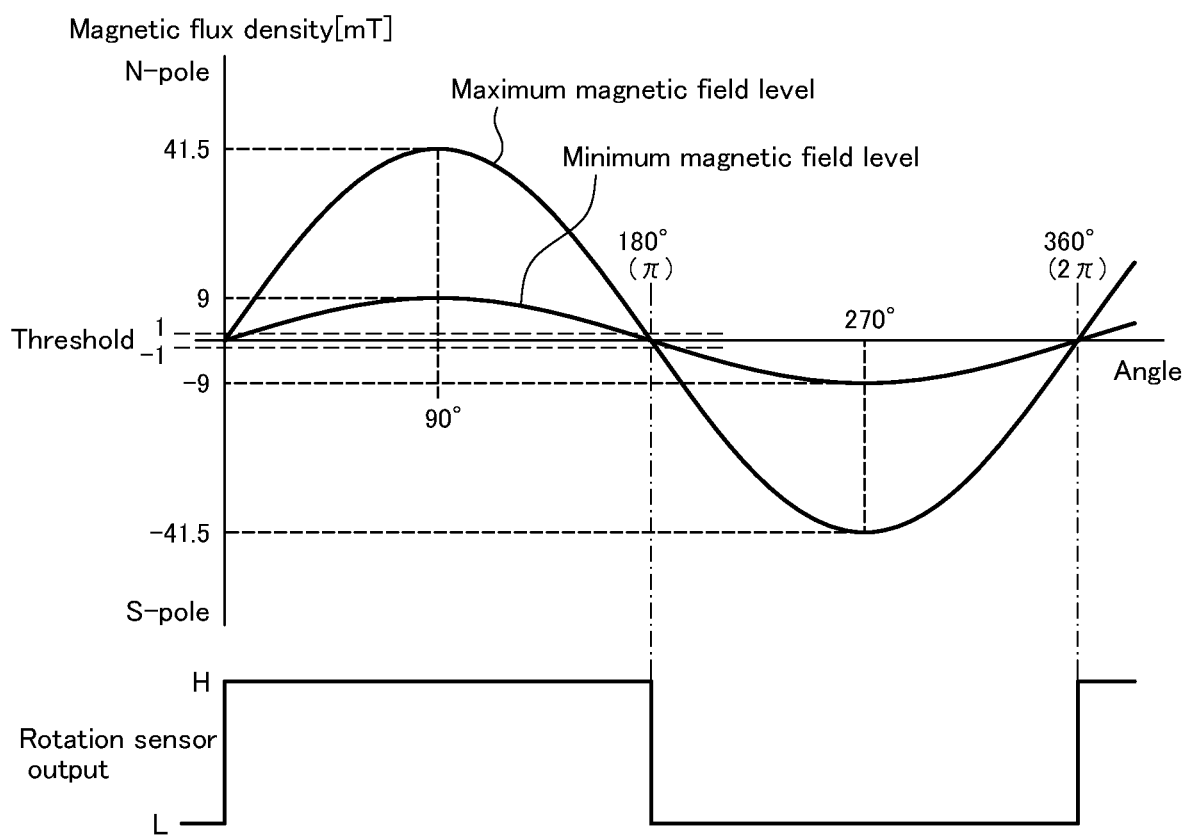
FIG. 4 is a diagram explaining the action of the rotation sensor.

A Hall element 202 is fixed to a fixed portion that is integrated with the housing of the motor at a distance of about 2 mm close to the magnet. With this structure, when the magnet 201 rotates in conjunction with the rotor of the motor 200, the magnetic flux density of the Hall element 202 changes sinusoidally with a rotor angle of 360 degrees of the motor 200 as one cycle, as shown in FIG. 4.

The Hall element 202 is configured such that the output signal is processed by a known comparator circuit (not shown) and signal-converted into a rectangular wave synchronized with the sine wave using a magnetic flux density of ±1 mT as a threshold. An electrical hysteresis is provided to avoid chattering of the output signal near the threshold, and the magnetic flux density conversion value corresponding to this hysteresis is ±1 mT.

Errors in the magnetization level of the magnet 201, changes in temperature, variations in magnetomotive force due to deterioration in durability, and variations in assembly gap between the magnet 201 and the Hall element 202 affect the Hall element. Furthermore, variations in the sensitivity of the Hall element 202 and the like have an effect. Thereby, the magnetic flux density of the Hall element 202 changes. The maximum magnetic field level and the minimum magnetic field level, shown in FIG. 4, are approximate representations of the varying magnetic flux density at the Hall element 202 portion.

The ±1 mT threshold is set because it is necessary to set a sufficiently small threshold compared to the magnetic flux density at the minimum magnetic field level.

As described above, the output signal of the Hall element 202 is converted into a rectangular wave and output as a rotation signal of the motor 200 by comparing it with a threshold voltage obtained by replacing the magnetic flux density with an electrical level by a comparator (not shown).

Here, as is clear from the comparison of the threshold value and the sine wave magnetic flux density, near the edge of the rectangular wave output of the comparator, the rectangular wave signal of the comparator output is inverted at a minute rotation angle of the magnet 201.

Hereinafter, the magnet 201, the Hall element 202, and the comparator that outputs the rectangular wave signal (not shown) are collectively referred to as a rotation sensor 20.

Here, assuming that the rotation stop position of the motor 200 when the electronic control unit 1 drives the reclining mechanism of the electric power seat is extremely close to the edge of the pulse output from the rotation sensor 20, After the energization of the motor 200 is cut off, the motor 200 may slightly rotate due to an external force acting on each part of the seat.

At this time, the rotation angle of the physical shaft due to such minute rotation of the motor 200 may exceed the edge position of the output pulse of the rotation sensor 20, and when the motor 200 is energized again to change the seat position, The number of pulses for the one count is missing.

Furthermore, when the rotation stop position of the motor 200 is very close to the edge of the pulse output by the rotation sensor 20, immediately after the rotation of the motor 200 stops. At that time, due to the backlash of the worm gear 210, the first gear 211, and the second gear 212, the motor 200 may rotate by a small angle immediately after stopping.

At this time, if the motor 200 stops at the falling edge of the pulse from the rotation sensor 20, the rising edge in the opposite direction may be detected immediately after. At that time, the electronic control unit 1 recognizes that the reclining mechanism has moved by one pulse in the control direction, and erroneously recognizes that it has moved by one pulse more than the original stop position.

The electric power seat of the first embodiment can store optimal driving positions set by a plurality of users, and at the same time, can correctly reproduce the position set by each user.

The electronic control unit 1 stores the seat positions such as the reclining position, the front-rear position, and the seat height position operated by the user at the time of initial setting. That is, the electronic control unit 1 stores the seat position by counting and integrating pulses output from the rotation sensor 20 while the actuator 2 is operating.

Next, when another user changes each position, the electronic control unit 1 recounts the number of output pulses of the rotation sensor 20, integrates and stores the amount of change. When the user who has made the initial settings operates the switch 3, the electronic control unit 1 energizes the DC motor 200 of the actuator 2 and counts the number of output pulses of the rotation sensor 20 at the same time. And, the electronic control unit 1 matches the initial setting value and the integrated value. As a result, the initially set seat position can be reproduced.

However, when the motor rotation stop position is very close to the edge of the pulse output from the rotation sensor 20 as described above, the electronic control unit 1 may erroneously determine the motor rotation angle by one count of the output pulse from the rotation sensor 20. As a result, the user's initial setting position or the reproduced sheet position is deviated.

Figure 5:
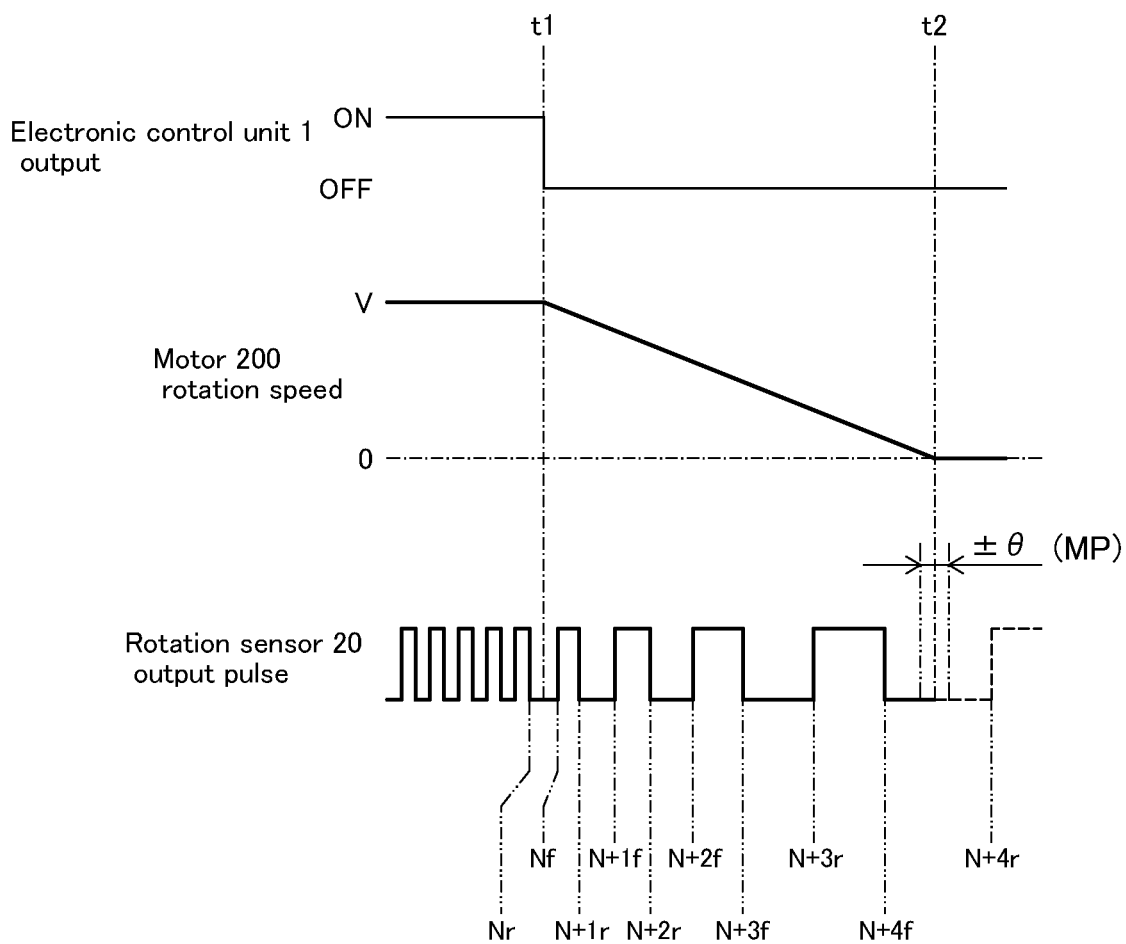
FIG. 5 is a diagram showing a motor stop and a stop position.

FIG. 5 shows the most basic embodiment of the positioning device and its control method of the present invention. The electronic control unit 1 integrates the output pulses of the rotation sensor 20, and a case where the vicinity of the N+4 count is set as the target rotation stop position is shown.

In FIG. 5, until time t1, the electronic control unit 1 energizes the power supply terminals (not shown) of the DC motor 200 to move the reclining mechanism in a predetermined direction. At this time, the motor rotation speed is v, and the rotation sensor 20 outputs a rectangular wave pulse with a predetermined cycle.

At the time t1, the electronic control unit 1 opens the power supply terminal to the DC motor 200 and stops energizing the DC motor 200 to start stopping the motor (inertial rotation mode).

By stopping the energization, the DC motor 200 gradually slows down. Then, the DC motor 200 stops at time t2 near the middle (target rotation stop position MP) between the fall f of the N+4 count and the rise r of the N+4 count of the output pulse of the rotation sensor 20 counted by the electronic control unit 1.

As a result, the rotation stop position of the DC motor 200, that is, the rotation stop position of the rotation sensor 20, stops near the middle between the falling edge f and the rising edge r of the pulse output by the rotation sensor 20. Therefore, even if the motor 200 is rotated by an external force after stopping as described above, an erroneous pulse is not generated unless the motor 200 is rotated by ±90 degrees or more.

In the example in FIG. 5, the DC motor is stopped at the center of the rising edge and the falling edge of the pulse. However, the stop is not limited to this, and may be at the middle of the pulse edges appearing at the rise and fall of the pulse.

The period from time t1 to t2 can take different values depending on the deceleration factor of the motor.

The deceleration factors include the presence or absence of braking force due to the frictional force of the mechanism and the regenerative current of the motor, and a plurality of these factors may be combined. Braking by regenerative current is a well-known technology and is not illustrated here.

Figure 6:
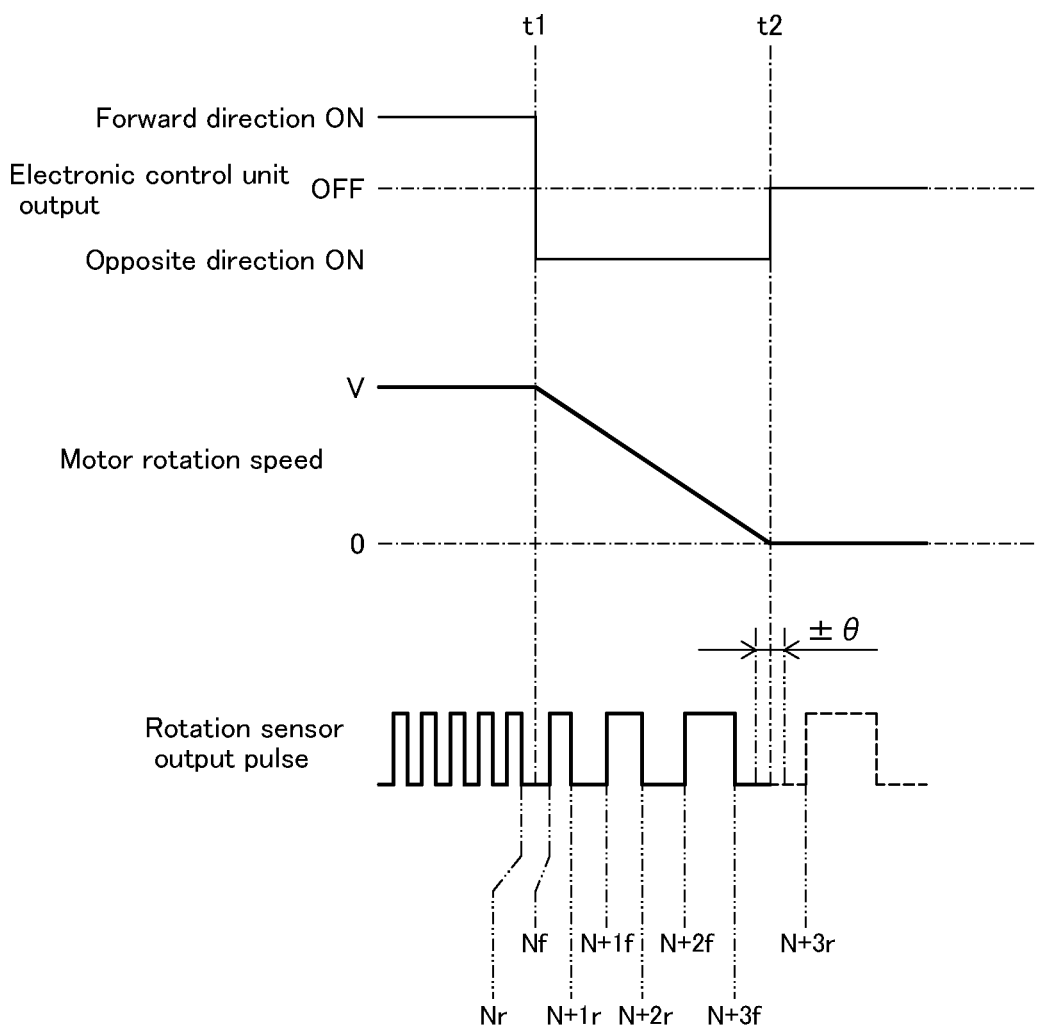
FIG. 6 is a diagram showing a motor stop and a stop position during reverse bias.

As another mode, as shown in FIG. 6, a method of braking by a reverse rotation bias is applied to the power supply terminal to apply power (reverse voltage) that gives a rotational force in a direction opposite to the direction of rotation of the motor. (forced brake mode). In this case as well, braking (brake mode) using the frictional force of the mechanism or the regenerative current of the motor may be combined with the reverse braking.

When the frictional force of the mechanism or the motor load fluctuates greatly, the overall braking force can be increased by applying regenerative current braking (brake mode) that electrically shorts the power supply terminals of the motor, or braking by reverse bias.

It is also possible to use a combination of two or more of the inertial rotation mode, forced braking mode, and braking mode described above.

Next, a specific means for stopping the motor in the middle of the edge of the pulse will be explained.

Figure 7:
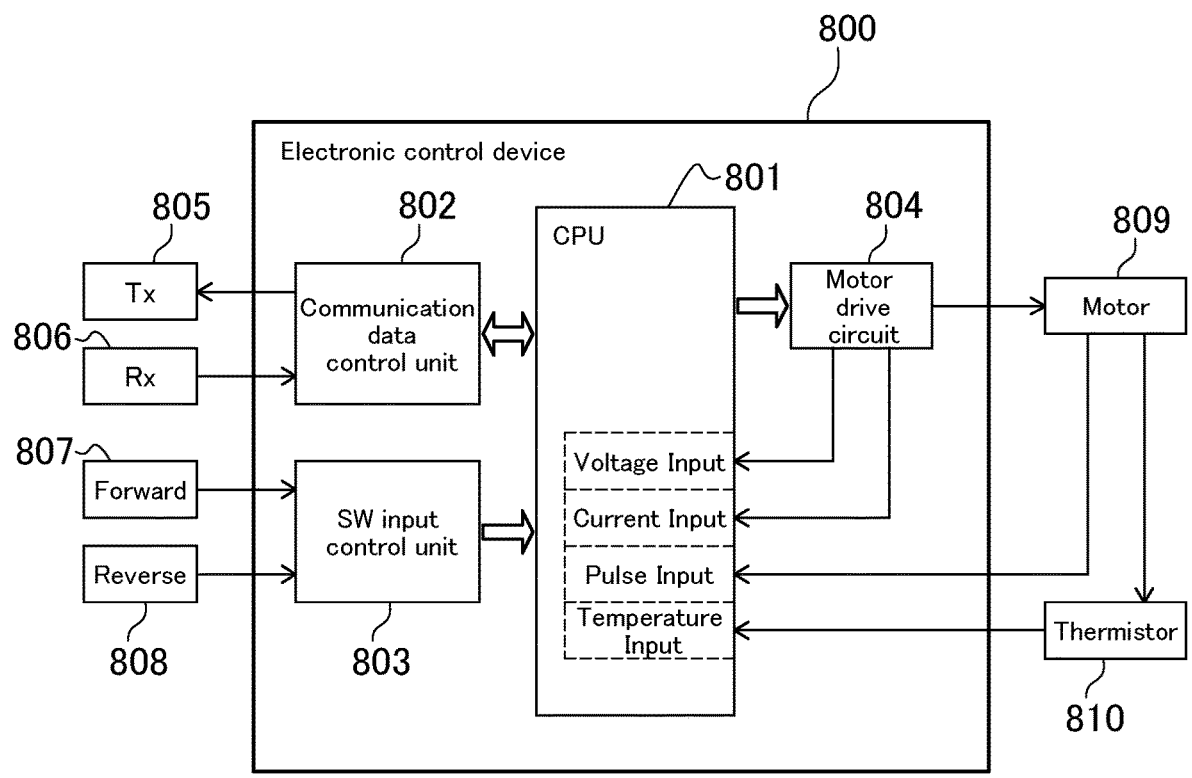
FIG. 7 is a diagram showing the configuration of a control device.

A configuration diagram of the control device 800 is shown in FIG. 7. The control device 800 is controlled by a CPU 801. A communication data control unit 802 is connected to the CPU 801 and can operate in cooperation with other control units via the communication data control unit 802. The control device 800 information is transmitted via Tx 805. Further, information necessary for motor driving such as motor driving timing and motor movement target point is received via Rx806.

Also, the SW input control unit 803 can detect the states of the direction designation switches 807 and 808 to drive the motor.

A motor 809 is driven by the CPU 801 via a motor drive circuit 804. The motor drive circuit 804 drives the motor by opening the power supply terminals, shorting the power supply terminals, inverting the polarity of the applied voltage, outputting the motor ON/OFF signal, voltage regulation, current regulation, and PWM output. An H bridge circuit is used for the motor drive circuit 804.

A pulse signal output from a motor 809, a signal from a thermistor 810 for measuring motor temperature, a current signal flowing through a motor drive circuit 804, and a voltage signal applied to the motor are connected to a CPU 810. The CPU can grasp the state of the motor.

Figure 8:
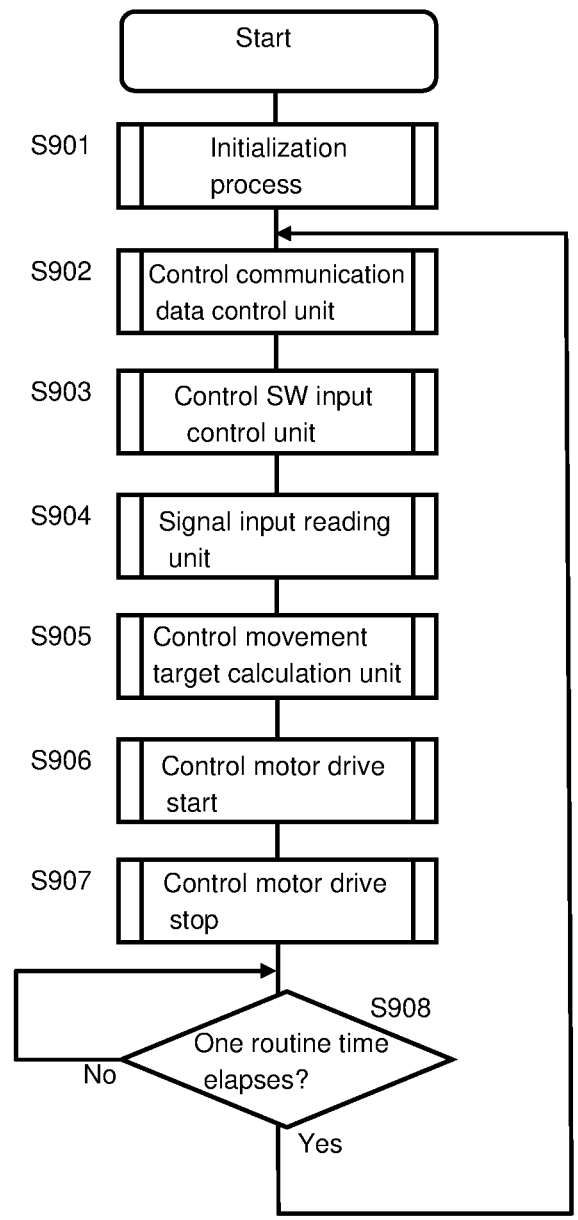
FIG. 8 is a diagram showing a CPU-wide control flow.

An overall control flow of the CPU 801 in FIG. 8 will be described. When the CPU is powered on, the flow shown in FIG. 8 is started. First, initialization processing is executed in step S901. In this initialization process, CPU ports and internal timers are initialized, and memory initial values are set. This initialization process is executed only once after the CPU is powered on.

Next, in step S902, the communication data control unit is controlled. In this control, data received by the communication data control unit 802 is extracted and data to be transmitted is written to the communication data control unit 802.

Next, in step S903, the SW input control unit 803 is controlled. In this control, chattering absorption processing is performed to determine the state of the SW, and the drive request for the motor is set/reset according to the determined state of the SW.

Next, in step S904, reading of signal input is controlled. In this control, the current flowing through the motor, the voltage applied to the motor, the motor pulse signal, and the motor temperature are read and stored in memory.

Next, in step S905, movement target calculation unit control is performed to calculate the target movement position when the motor moves to any of a plurality of positions registered in advance or when it moves by a specified amount from the current position. The current position and movement position are memorized by a pulse counter that counts the output of the hall sensor, and the drive request for the motor is set/reset according to the difference between the target position and the current position.

Next, in step S906, motor drive start control is performed. In this control, the motor is driven by designating the motor ON/OFF signal, the amount of voltage regulation, the amount of current regulation, and the amount of PWM output to the motor drive circuit 804 in accordance with the set/reset state of the above drive request.

Next, in step S907, motor drive stop control is performed. In this control, a motor ON/OFF signal, voltage regulation amount, current regulation amount, and PWM duty are designated to the motor drive circuit 804 to end the motor drive.

Finally, in step S908, one routine time elapses, and when a predetermined time elapses, steps S902 to S907 are executed again.

Details of the motor stop mode will now be described with reference to FIGS. 9 to 22.

Figure 9:
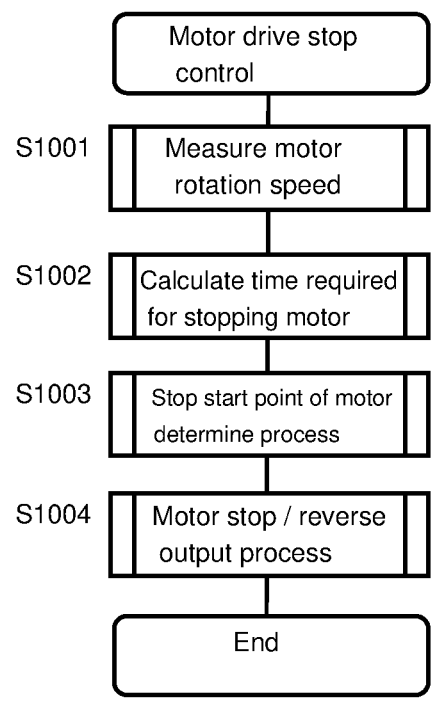
FIG. 9 is a diagram showing a motor drive stop control flow.

First, the motor drive stop control flow in FIG. 9 will be described. In step S1001, the speed during motor driving is calculated. The speed can be calculated by measuring the average pulse edge interval during motor driving or the pulse edge interval time immediately before stopping the motor.

Figure 10:
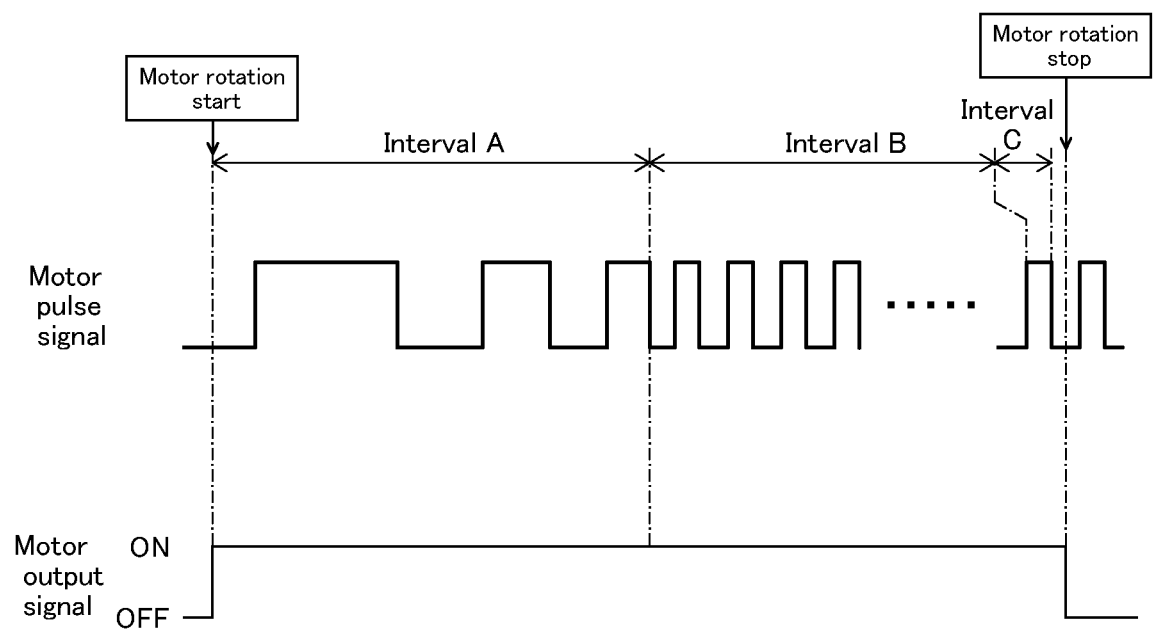
FIG. 10 is a diagram showing a motor pulse signal and speed.

Details regarding this pulse edge interval measurement are described in FIG. 10.

In order to accurately measure the speed during steady-state rotation, the average pulse edge interval is calculated by averaging the pulse edge intervals generated during the period B from the end of the motor rise period A to the start of the motor stop. Period C may be adopted as the final pulse edge interval.

This will

Angular velocity calculated from "average time between pulse edges in period B (T0avr)"

$$= \pi/T0avr = \omega avr$$

and

The angular velocity calculated from "the time (T0sgl) of the final pulse edge interval (period C)"

$$= \pi/T0sgl = \omega sgl$$

can be calculated and stored in memory.

Next, in step S1002, the time required from turning off the motor output signal to stopping the motor is detected. This time corresponds to T2 described in FIGS. 11 and 12.

Figure 11:
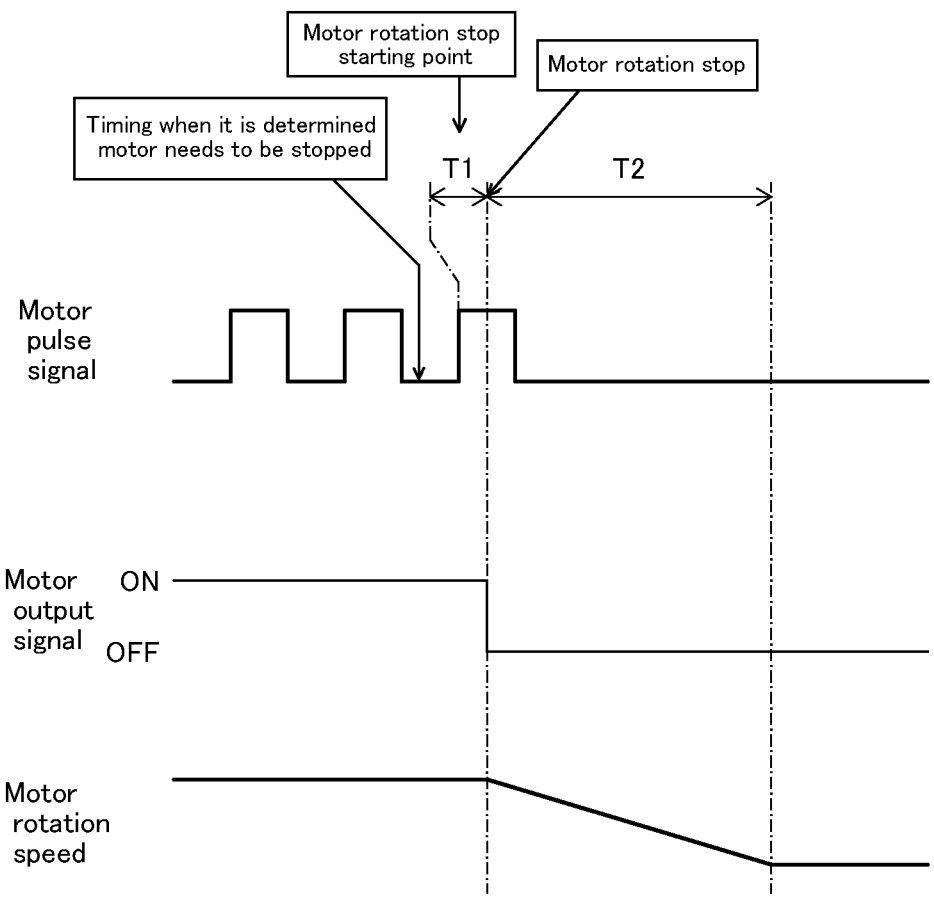
FIG. 11 is a diagram showing a stop position when a pulse edge is used as a motor stop starting point.
Figure 12:
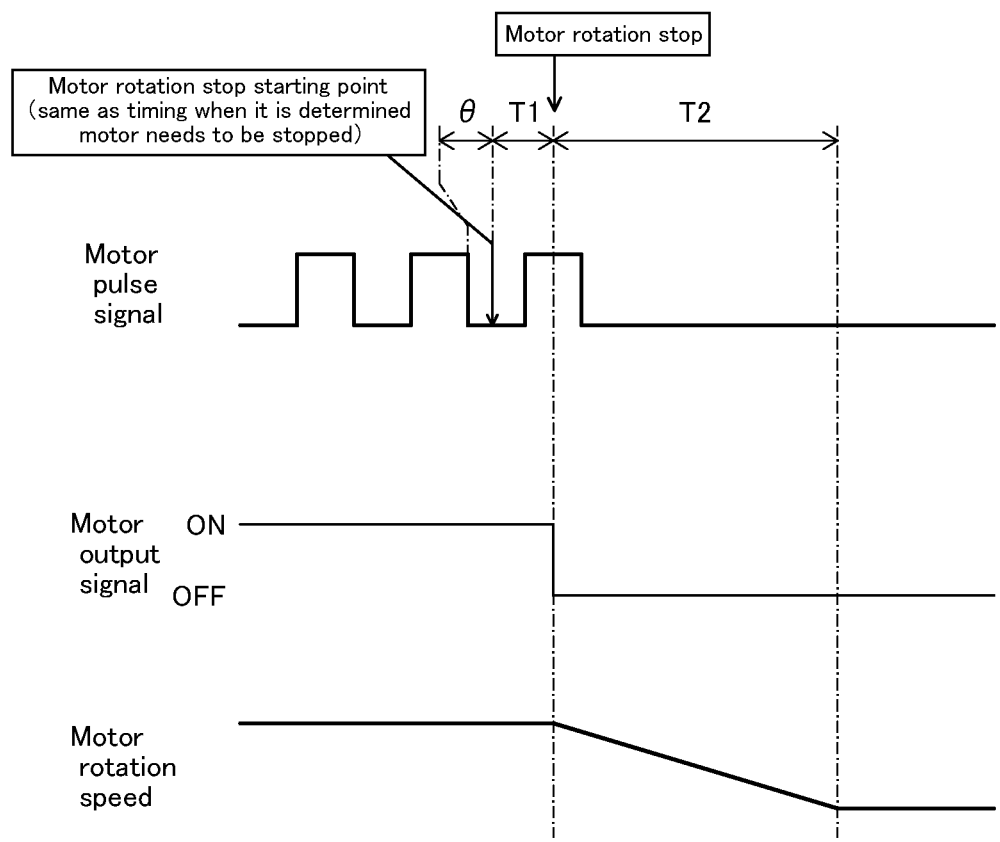
FIG. 12 is a diagram showing a stop position when arbitrary timing is used as a motor stop start point.

FIG. 11 (motor stop starting point 1) is the case where the current rotation angle of the motor is unknown at the timing when it is determined that the motor needs to be stopped. In this case, the timing at which the pulse edge is detected is set as the motor rotation stop starting point. FIG. 12 (motor stop starting point 2) is the case where the current rotation angle θ of the motor is known at the timing when it is determined that the motor needs to be stopped. If the current rotation angle of the motor is known, that time is set as the motor rotation stop starting point. T2 is calculated based on a value measured in advance, taking into consideration environmental conditions such as the motor rotation speed, temperature, and motor load.

Next, in step S1003, the start point (stop start point) of the timer that measures the timing of turning off the motor output signal is determined.

The stop starting point is the timing at which the measurement of T1 in FIGS. 11 and 12 is started. FIG. 11 shows that when the pulse edge is set as the stop starting point and the motor output signal is turned off after T1 has passed, the motor stops after T2 has passed. That is, the motor signal is turned off at a predetermined timing synchronized with the output pulse of the rotation sensor so that the difference between the estimated stop position and the target rotation stop position is zero. This is also the case when the motor is reversed and stopped, and the reverse rotation is started after T1 has elapsed, and the motor is stopped by performing the reverse rotation during the period of T2. T1 can be adjusted so that when the motor stops, it stops exactly in the middle between the pulse edges. in short, $$\text{Rotation angle at time } T1 + T2 = \pi + (1/2) \times \pi$$

should be
If the interval of T1+T2 is large and (n) pulse edges are straddled between T1+T2, $$\text{Rotation angle at time } T1 + T2 = n \times \pi + (1/2) \times \pi$$

should be
In FIG. 11, n=1 because it straddles one pulse edge.

FIG. 12 shows a case where SW807 and SW808 are OFF and the timing at which it is determined that the motor needs to be stopped, such as when the target movement position is reached, is set as the stop starting point.

When the motor output signal is turned off after T1 has elapsed from the stop starting point, the motor stops after T2 has elapsed.

T1 should be adjusted so that when the motor stops, it stops exactly in the middle between the pulse edges. Let θ be the motor rotation angle when it is determined that the motor needs to be stopped.

$$\text{Rotation angle at time } T1 + T2 = n \times \pi - \theta + (1/2) \times \pi$$

should be In FIG. 12, n=2 because it straddles two pulse edges.

In this case, it is necessary to recognize θ by always measuring the motor rotation speed while the motor is being driven.

θ can be obtained by calculating the angular velocity from the pulse edge interval and multiplying it by the elapsed time from the pulse edge.

FIG. 11 can be said to be a special case where θ=0 can be confirmed by pulse edge measurement. As long as it is possible to recognize θ, any timing can be used as the stop starting point without being limited to the timings shown in FIGS. 11 and 12.

The rotation angle that rotates in the period of T1 is $$T1 \text{ time rotation angle} = \omega \times T1 = \pi \times T1/T0$$

becomes. For ω, ωavr or ωsgl described above with reference to FIG. 10 is used.

When obtaining the rotation angle that advances in the period of T2, first, the deceleration angular acceleration α is obtained. Since the angular velocity becomes 0 in the period of T2, $$\omega - \alpha \times T2 = 0$$

holds. For this reason, $$\alpha = \omega/T2 = \pi/(T0 \times T2)$$

becomes.

Here, the rotation stop position is estimated from the deceleration of the DC motor, and deceleration control is performed to stop the motor at the target rotation angle position.

Therefore, the rotation angle of T2 is $$\omega \times T2 - (1/2)\alpha \times T2 \times T2 =$$
$$(\pi/T0) \times T2 - (1/2) \times (\pi/(T0 \times T2)) \times T2 \times T2 = (1/2) \times \pi \times (T2/T0)$$

becomes. From now on, the angle that advances in T1+T2 is $$\pi \times T1/T0 + (1/2) \times \pi \times (T2/T0)$$

becomes. Since this rotation angle should be n×π−θ+(1/2)×π, $$\pi \times T1/T0 + (1/2) \times \pi \times (T2/T0) = n \times \pi - \theta + (1/2) \times \pi$$

holds.
Than this $$T1 = ((n \times \pi - \theta + (1/2) \times \pi) \times T0 - (1/2) \times \pi \times T2)/\pi$$
$$T1 = (1/2) \times (T0 - T2) \ldots n = 0, \theta = 0$$

to obtain T1.

In the case of the form shown in FIG. 11, T1 may be obtained by substituting θ=0.

The explanation here assumes that the deceleration acceleration is constant (linear), but if the deceleration curve is known, it can be used for calculation.

Next, in step S1004, the elapsed time of T1 is detected, and the motor output signal is turned OFF to stop the motor. When the motor is to be reversed, the motor is reversed for a period of T2.

Although FIG. 11/FIG. 12 describes the case where the motor is not reversed, the same calculation formula can be used when the motor is reversed.

Next, the details of the motor stop required time calculation (S1002) in FIG. 9 will be described with reference to FIGS. 13 to 21. As a calculation method, there are two methods shown in FIG. 13. That is, there are a method 1 of calculation using a table and a method 2 of calculation using the magnitude of the load.

When calculating using tables in method 1, the six tables shown in FIG. 14 are used for calculation.
 (1) Use a table for each moving direction (FIG. 14(A)).
 (2) Use a table for each movement angle (FIG. 14(B)).
 (3) Using tables for different rotation directions (FIG. 14(C)).
 (4) Use a table for each stop position (FIG. 14(D)).
 (5) Use a table by aging time (FIG. 14(E)).
 (6) Use a temperature-specific table (FIG. 14(F)).

Of course, it is possible to combine six and assemble a more detailed pattern.

For example, (1) moving direction and (4) stop position may be combined.
 (1) Sub-patterns such as upward (M11)/downward (M12)/forward (M13)/backward (M14)/leftward (M15)/rightward (M16) as measurements by movement direction can be considered (FIG. 14(A)). Subpatterns differ due to the influence of gravity and the like.
 (2) A pattern such as upward angle (M21)/downward angle (M22)/leftward angle (M23)/rightward angle (M24) can be considered as a measurement for each movement angle (FIG. 14(B)).
 (3) A pattern such as upward rotation (M31)/downward rotation (M32)/leftward rotation (M33)/rightward rotation (M34) is conceivable as a measurement of the direction of rotation (FIG. 14(C)).
Measure the relationship between T2, motor speed, and motor applied voltage for each of M11 to M16/M21 to M24/M31 to M34.
 (4) T2 is measured at a plurality of (n) points within the operating range as measurement for each stop position. For example, a plurality of points may be selected for each fixed distance or each rotation angle, or measurement may be performed at points where mechanical resistance changes (FIG. 14(D)).
Measure the relationship between T2, motor speed, and motor applied voltage for each of these M41 to M4n.
 (5) A plurality of (n) drive times are measured in advance as measurements for each aging time. The driving time in this case is the driving time compared with the life cycle of the product. For example, for a product with a life of 10,000 hours, measurement is performed by positioning timings such as 100 hours (M51), 200 hours (M52), 300 hours (M53), etc. as measurement time points (FIG. 14 (E)).
Measure the relationship between T2, motor speed, and motor applied voltage for each of M51 to M5n.
 (6) As a measurement for each temperature, measure at a plurality of (n) temperatures within the guaranteed range (FIG. 14(F)).
Measure the relationship between T2, motor speed, and motor applied voltage for each of M61 to M6n.

The temperature can be measured using the thermistor shown in FIG. 7.

Also, even if the thermistor is not installed, the temperature information may be acquired via the communication data control section shown in FIG. 7. As for the information, date/time information and location information may be acquired and the temperature may be estimated from them.

Figure 15:
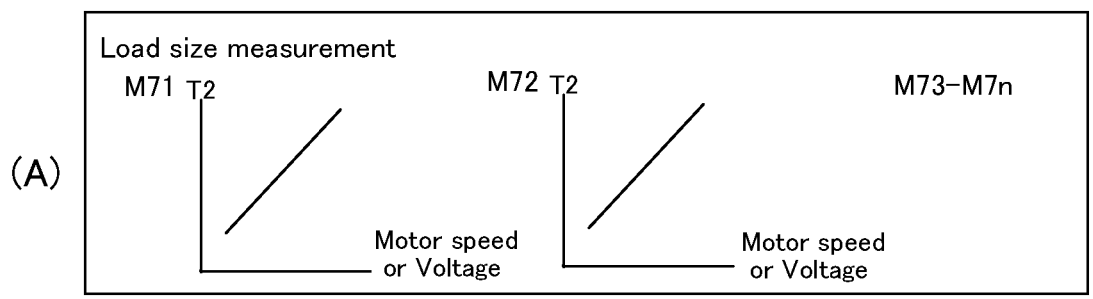
FIG. 15 is a diagram showing a table of T2 according to load.

When calculating using the magnitude of the load in method 2, calculate by the method shown in FIG. 15.

A plurality of (n) loads are measured in advance for each load size measurement. For each of M71 to M7n, the relationship between T2 and motor speed/motor applied voltage is measured as shown in FIG. 15(A).

There are the following two methods for detecting the actual load (load condition) applied while the motor is running.

(A) A method of determining from load information acquired from a control device cooperating in communication and load information stored in the control device 800 in advance.

(B) A method of measuring the load while the motor is running.

There are the following three methods of (B).
 (B-1) Measure the current flowing through the motor and determine the load (FIG. 16).

Figure 16:
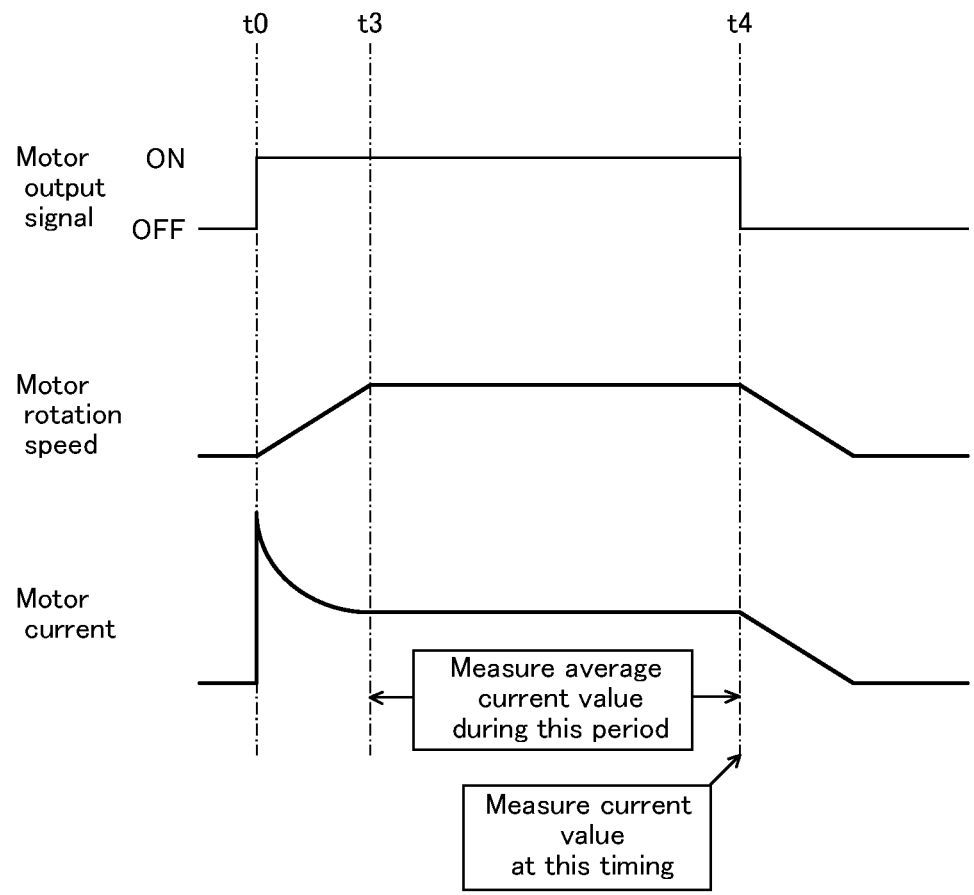
FIG. 16 is a diagram showing the measurement area of the motor current.
Figure 17:
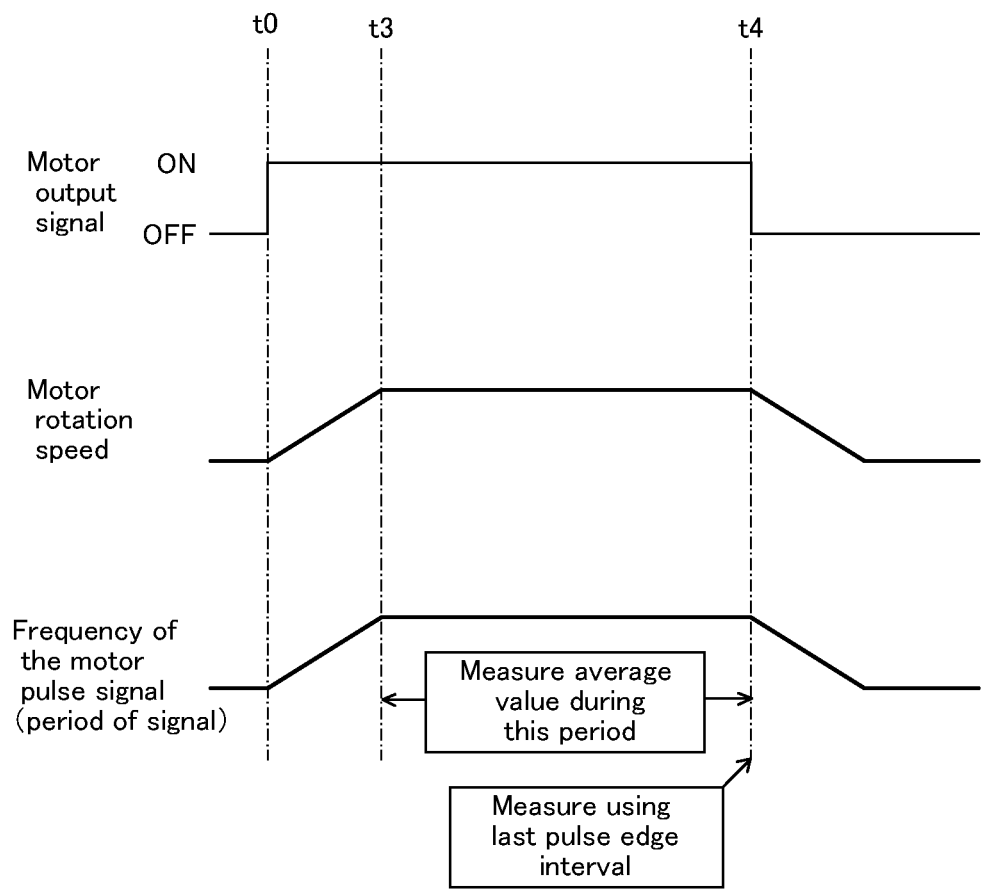
FIG. 17 is a diagram showing the measurement area of the motor voltage.

In FIG. 16, the motor output signal turns ON at timing t0, and the motor rotation speed reaches constant rotation at timing t3. The motor output signal turns OFF at timing t4. The average current value during the period from timing t3 to timing t4 is measured. Alternatively, the current value at timing t4 is measured.
 (B-2) Measure the period of the motor pulse signal (or the rotation speed of the motor calculated from the period), and determine the load from the ratio of the period to the current, voltage, and power (FIG. 17).
 (B-3) Measure the frequency of the motor pulse signal and determine the load from the ratio of the frequency to the current, voltage, power, etc. (FIG. 17).

In FIG. 17, the motor output signal turns ON at timing t0, and the motor rotation speed reaches constant rotation at timing t3. The motor output signal turns OFF at timing t4. An average value is measured during the period from timing t3 to timing t4. Alternatively, the last pulse edge interval is used to measure the value.

In the embodiments of FIGS. 16 and 17,

The load is associated with (pulse period/current), or (pulse period/voltage), or (pulse period/power).

The load is associated with (pulse period×current), or (pulse period×voltage), or (pulse period×power).

The values used as measurements in (B-1) to (B-3) are the average values during motor drive (excluding the start-up period) or the values immediately before stopping. Since the average value while the motor is stably rotating is required, the measured value while the motor is starting up is not used for calculating the average value.

When using the average value, it is possible to avoid the effects of instantaneous load fluctuations, but on the other hand, it is likely to cause a deviation from the load immediately before stopping.

If the value immediately before the stop is used, the load at the stop timing can be measured, but it is susceptible to sudden load fluctuations. The most advantageous one may be selected depending on the characteristics of the load.

In Method 1 and Method 2 described so far, it is necessary to measure M11 to M16, M21 to M24, M31 to M34, M41 to M4n, M51 to M5n, M61 to M6n, and M71 to M7n as necessary. One way to reduce the number of measurements is to slow down the motor to a constant speed and then stop it.

The number of measurements can be reduced by starting stop control after always reducing the motor speed to a constant speed.

FIG. 18(A) shows the case where T2 is calculated when the motor is not decelerated. It is necessary to measure not only low rotational speeds but also the entire range of high rotational speeds.

As shown in FIG. 18(B), if stop control is started after the motor speed has always been reduced to a constant speed, there is no need to measure a speed higher than the speed at which deceleration is started.

A method for reducing the motor speed can be achieved by reducing any one of the motor voltage, motor current, and motor voltage PWM duty value in the motor drive circuit 804. The rotational speed of the DC motor set by the rotational speed control can also be determined based on the motor load state immediately before stopping or starting reverse rotation of the DC motor. The motor load state can be calculated from at least one of the following information: the rotational speed of the motor calculated from the output pulses of the rotation sensor, the voltage applied to the motor, or the current value of the motor.

By implementing the embodiments described so far, the motor can be stopped at the center between the pulse edges.

However, in the actual usage environment, there are cases where the product is used in a state where the mechanism is worn out and the product life is clearly exceeded, and the product is used in situations that are not covered by the product warranty. In such a case, the deviation between T2 in FIGS. 14(A) to 14(D) and FIG. 15(A) and T2 that is actually effective becomes large.

Of course, even if the deviation is large, it is preferable to operate as close to the original target as possible.

Figure 21:
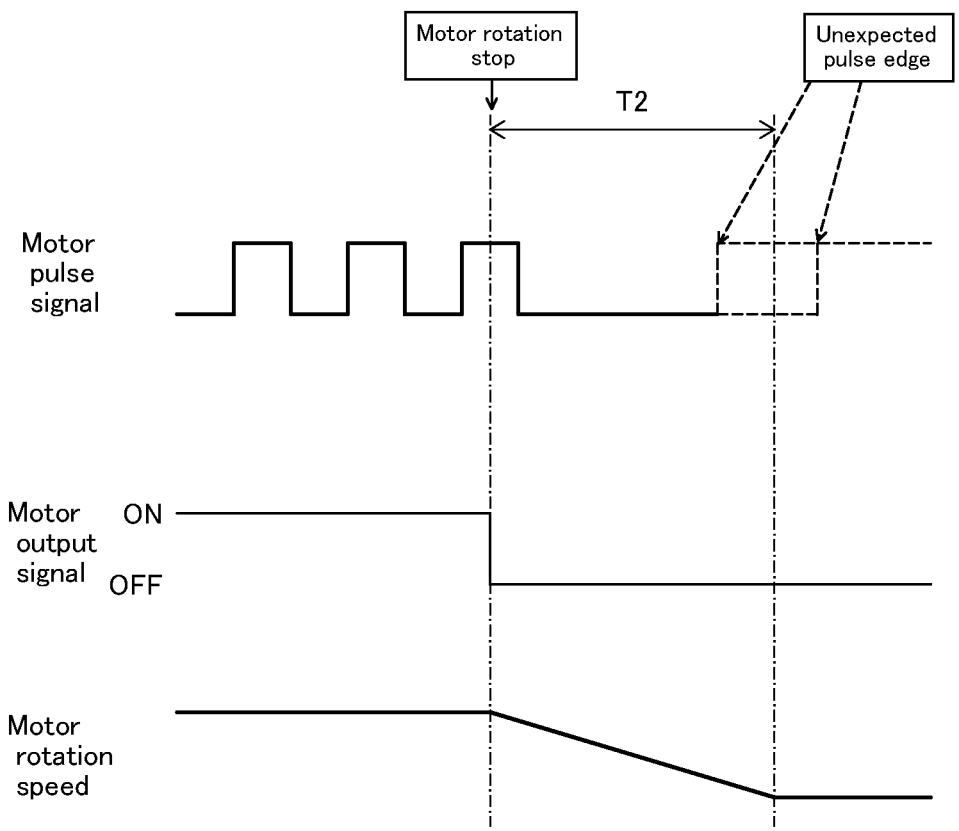
FIG. 21 is a diagram showing how an unexpected pulse edge appears.

Symptoms when the deviation is large are as shown in FIG. 19(A), when the pulse edge is detected after a wide interval after the motor starts; as shown in FIG. 19(B), when the pulse edge is detected immediately after the motor starts; and as shown in FIG. 21, when unexpected pulse edge is detected before or after the motor is stopped.

This phenomenon occurs because the motor does not stop at the center of the pulse edge interval in either case. In this case, learning control is used.

Figure 19:
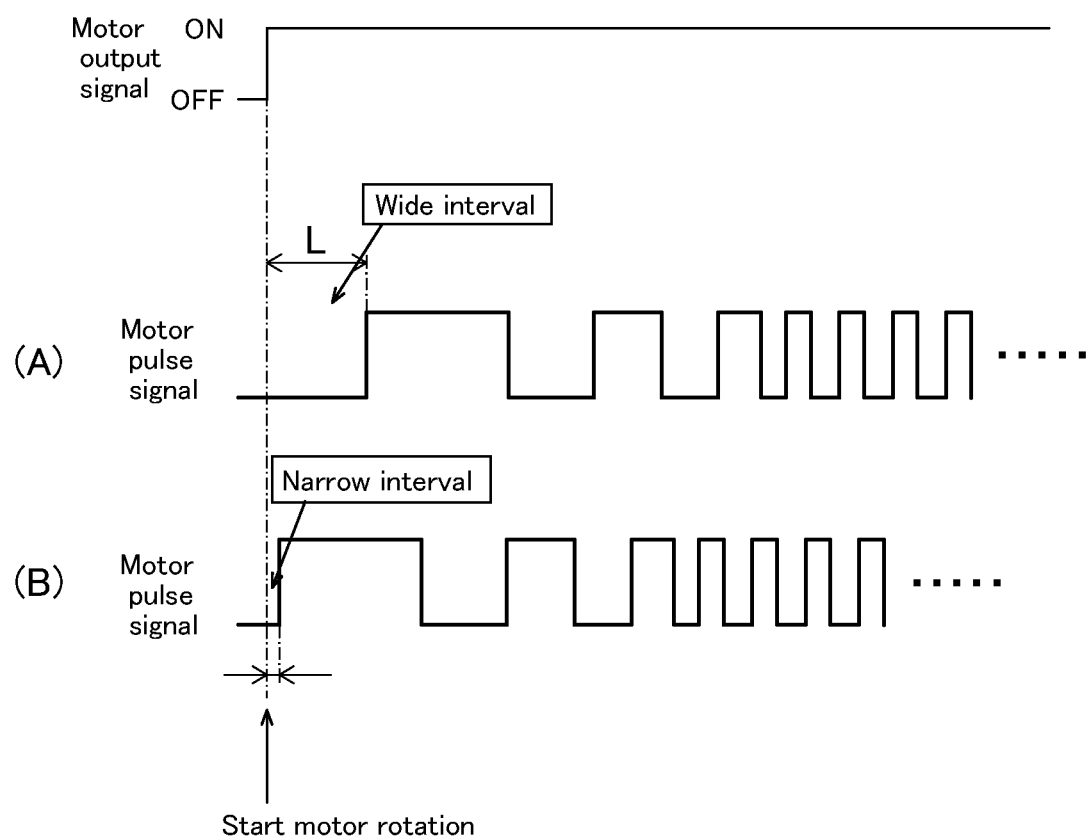
FIG. 19 is a diagram showing pulses when there is a deviation of T2.
Figure 20:
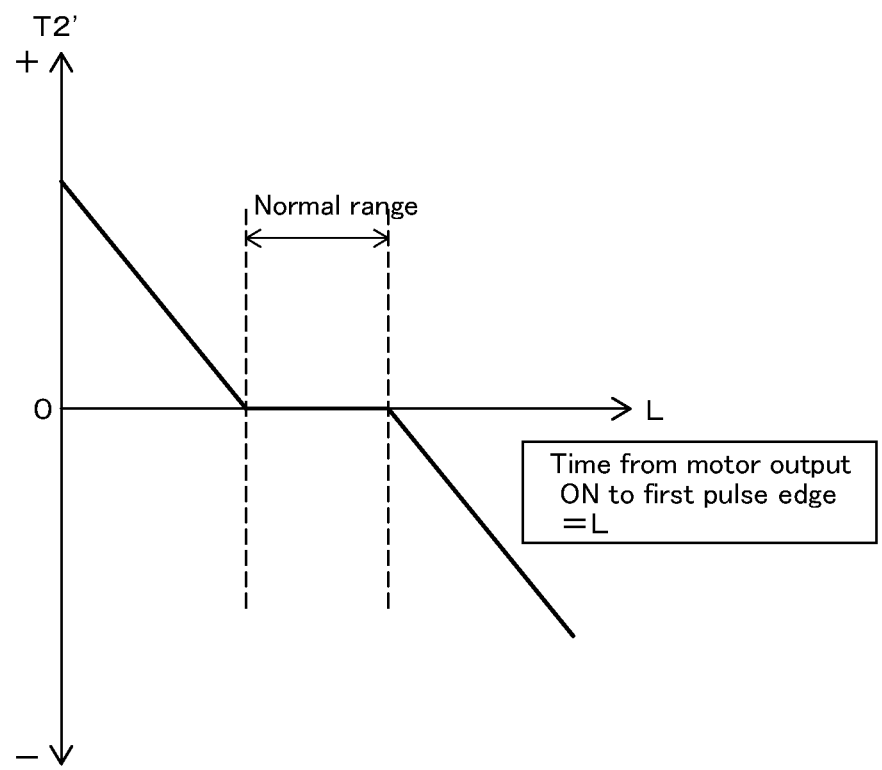
FIG. 20 is a diagram showing a T2 correction amount.

In the case of FIG. 19, the value of T2 is adjusted as shown in FIG. 20.

The value adopted as T2 is T2+T2'.

As shown in FIG. 19(B), if the time (L) from motor output ON to the first pulse edge is smaller than the normal range, it indicates that the motor has stopped beyond the center of the pulse edge interval. There is. Therefore, T2' increases as it falls below the normal range. As shown in FIG. 19(A), on the other hand, when the value becomes larger than the normal range, it indicates that the pulse edge interval is stopped before the center of the pulse edge interval. Therefore, T2' becomes larger as a negative value as it exceeds the normal range.

In the case of FIG. 21, the motor is shown to have stopped beyond the center of the pulse edge.

Therefore, it is necessary to increase T2 for a certain period of time.

The value adopted as T2 is T2+T2".

In this case, it is preferable to adopt a small value for T2" and increase it little by little each time the symptoms shown in FIG. 21 occur. This is because if a large value is set from the beginning, there is a possibility that the motor will stop far before the center of the pulse edge.

That is, in this learning control, the start timing of the deceleration control is adjusted so as to reduce the difference between the rotation stop position and the target rotation stop position (the center of the pulse edge). In addition to this, the stop control can also be performed by learning control such that the value for controlling the rotational speed is corrected so that the motor speed becomes a predetermined value before the start of the stop control. Furthermore, stop control includes an inertial rotation mode that cuts off power to the DC motor, a brake mode that electrically shorts the power supply terminals of the DC motor, and a forced braking mode in that applies electric power to the power supply terminals of the DC motor to give a rotational force in the direction opposite to the operation direction. It is also possible to perform learning control so as to correct the selection state of each of these modes.

In this stop control, each of the above-mentioned corrected states is learned and stored as a plurality of parameters corresponding to the movable position or moving direction of the moving body.

Figure 22:
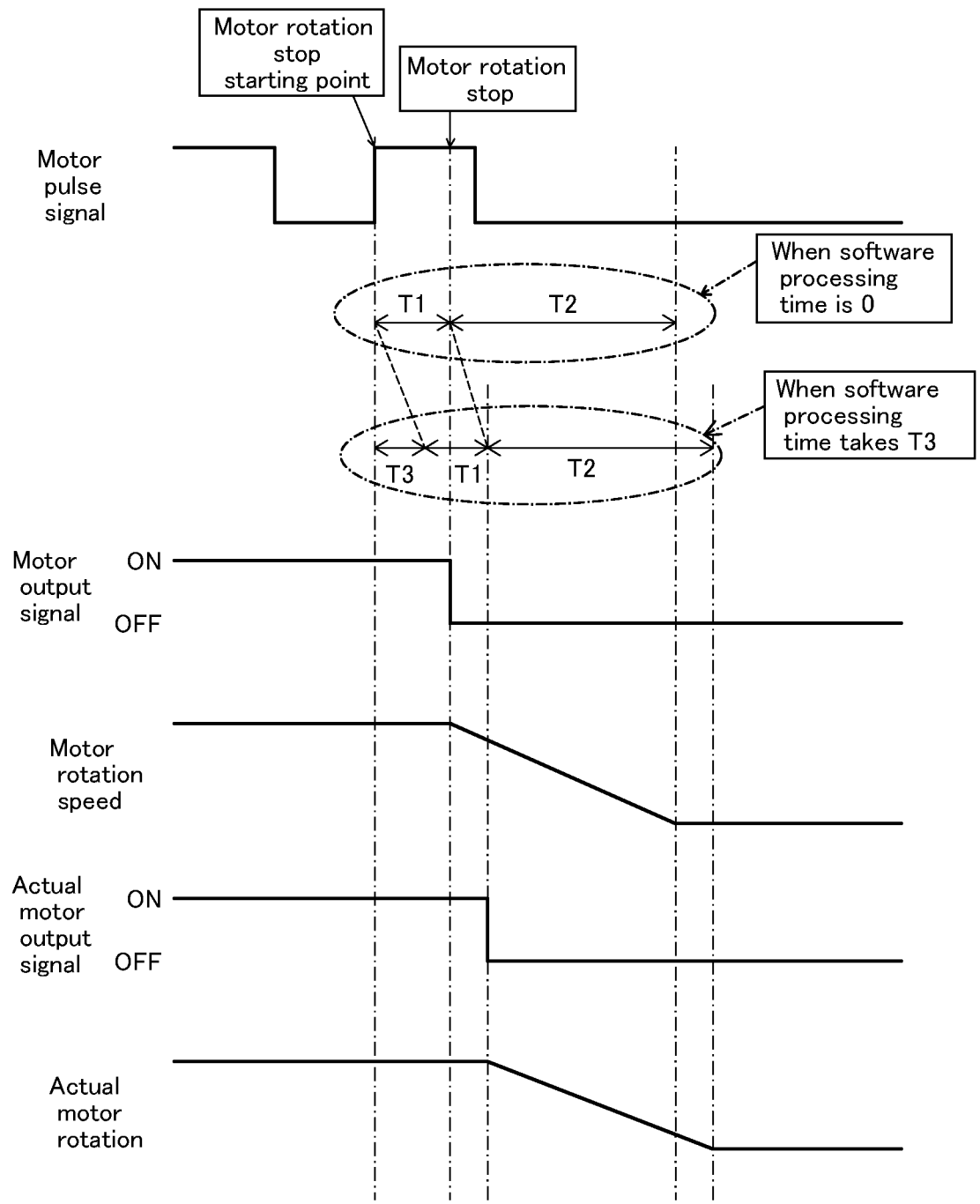
FIG. 22 is a diagram showing the influence of software processing time.

In addition, since the pulse edge interval is large, sometimes on the order of several milliseconds, the software processing time may not be negligible. In FIG. 22, the timer T1 is activated after the motor rotation stop starting point is detected, but if it takes T3 as software processing time to activate the timer, the actual motor stop will be delayed by T3. This causes the motor stop position to shift from the center of the pulse edge.

Therefore, the value adopted as T1 needs to be T1-T3.

In the embodiment, an electric power seat is illustrated, but it is also applicable to an electric tilt/telescopic steering device.

The invention claimed is:

1. A positioning device, comprising:
   an actuator connected to a moving body and composed of a DC motor, a speed reduction mechanism, and a single-phase rotation sensor for detecting an amount of rotational displacement of the speed reduction mechanism; and
   the electronic control device for electrically driving the DC motor;
   wherein
   the electronic control device comprises stop control means for performing deceleration control so as to stop the DC motor, with a target rotation stop position set substantially midway between the rising edge and the falling edge of the output pulse of the rotation sensor.

2. The positioning device according to claim 1, wherein the stop control means performs deceleration control to decelerate and stop the DC motor in an inertial rotation mode in which power supply to the DC motor is interrupted.

3. The positioning device according to claim 1, wherein the stop control means performs deceleration control to decelerate and stop the DC motor in a braking mode in which power supply terminals of the DC motor are electrically shorted.

4. The positioning device according to claim 1, wherein the stop control means performs deceleration control to decelerate and stop the DC motor in a forced braking mode in which electric power is applied to power supply terminals of the DC motor to provide a rotational force in a direction opposite to the direction in which the DC motor rotates during operation.

5. The positioning device according to claim 1, wherein the stop control means performs deceleration control to decelerate and stop the DC motor by combining at least the following two or more modes:

The modes are;
an inertial rotation mode in which power supply to the DC motor is cut off,
a braking mode in which the power supply terminals of the DC motor are electrically shorted, and
a forced braking mode in which electric power is applied to the power supply terminals of the DC motor to give a rotational force in the direction opposite to the direction in which the DC motor rotates during operation.

6. The positioning device according to claim 1, wherein the stop control means estimates a rotation stop position from the deceleration of the DC motor, and decelerates the DC motor to stop at the target rotation stop position, in a process of controlling the DC motor to decelerate and stop.

7. The positioning device according to claim 1, wherein the stop control means controls the rotation speed of the DC motor so that the rotation speed before starting control to decelerate and stop the DC motor reaches a predetermined value.

8. The positioning device according to claim 7, wherein the rotation speed control is performed by making the voltage applied to the power supply terminal of the DC motor variable.

9. The positioning device according to claim 7, wherein the rotation speed control is performed by making the current applied to the power supply terminal of the DC motor variable.

10. The positioning device according to claim 7, wherein the rotation speed control is performed by making the duty ratio of the voltage applied to the power supply terminals of the DC motor variable.

11. The positioning device according to claim 7, wherein the rotational speed of the DC motor set by the rotational speed control of the stop control means is a function of an ambient temperature of the DC motor.

12. The positioning device according to claim 7, wherein the rotation speed of the DC motor set by the rotation speed control of the stop control means is determined by the motor load state immediately before starting the process of controlling the speed reduction of the DC motor.

13. The positioning device according to claim 12, wherein the load state of the motor is calculated from at least one information of the rotation speed of the motor calculated from the output pulse of the rotation sensor, the voltage applied to the motor, or the current value of the motor.

14. The positioning device according to claim 12, wherein the stop control means calculates the load of the DC motor by using at least one of output pulse period/voltage, output pulse period/current, and output pulse period/power.

15. The positioning device according to claim 1, wherein the stop control means starts the process of performing the deceleration control so as to stop the DC motor at the target rotation stop position at a predetermined timing synchronized with the output pulse of the rotation sensor.

16. The positioning device according to claim 1, wherein the stop control means
calculates a required motor stop time T2 required from the start of stop control of the DC motor to the actual stop of the DC motor,
calculates a time T1, which is the difference between the timing of starting the stop control and the current time, in order to stop the DC motor at the target rotation stop position; and
when it is determined that it is necessary to stop the DC motor, after the time T1 has passed, starts a control to stop the DC motor.

17. The positioning device according to claim 16, wherein the required motor stop time T2 is calculated by providing a table of the relationship between the rotational speed or applied voltage of the DC motor and the required motor stop time T2,
such a table is configured by at least one of per movement direction, per movement angle, per rotation direction, per stop position, per aging time, and per temperature.

18. The positioning device according to claim 16, wherein when the stop control means calculates the time T1, which is the difference between the timing of starting the stop control and the current time, the time T1 includes the time T3 required for arithmetic processing.

19. The positioning device according to claim 1, wherein the moving body is an electric power seat for a vehicle.

20. The positioning device according to claim 1, wherein the moving body is an electric tilt/telescopic steering system for a vehicle.

21. A control method for the positioning device according to claim 1.

* * * * *